W. LITSEY.
AUTOMATIC FLANGE OILER.
APPLICATION FILED OCT. 31, 1910.
1,001,155.
Patented Aug. 22, 1911.
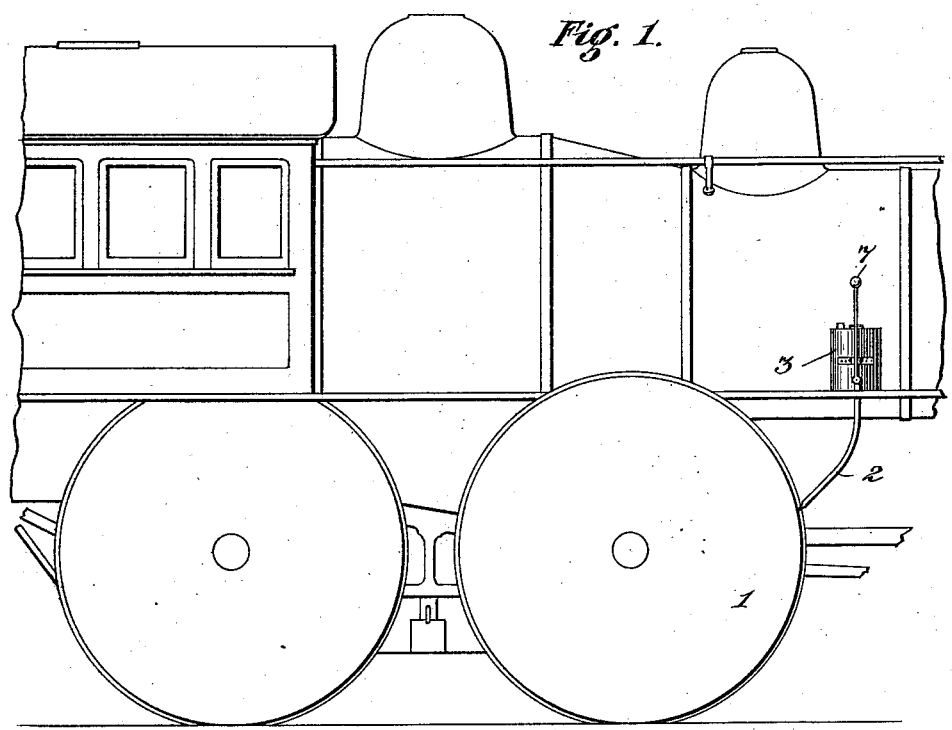
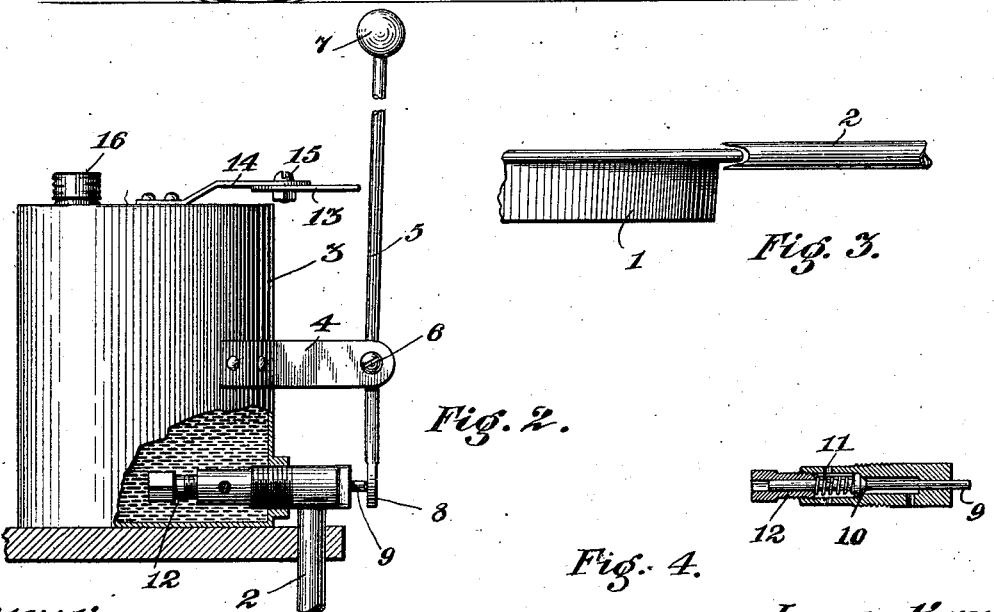

UNITED STATES PATENT OFFICE.

WALLACE LITSEY, OF LOUISVILLE, KENTUCKY.

AUTOMATIC FLANGE-OILER.

1,001,155.  Specification of Letters Patent.  Patented Aug. 22, 1911.

Application filed October 31, 1910. Serial No. 590,096.

*To all whom it may concern:*

Be it known that I, WALLACE LITSEY, a citizen of the United States, and a resident of Louisville, in the county of Jefferson and State of Kentucky, have invented an Improved Automatic Flange-Oiler, of which the following is a full, clear, and exact description.

The object of the invention is to provide a simple and efficient device for automatically feeding a lubricant to the flanges of car or locomotive wheels.

The invention consists of novel features and parts and combinations of the same, which will be more fully described hereinafter and then pointed out in the claims.

A practical embodiment of the invention is represented in the accompanying drawings, forming a part of this specification.

Figure 1 is a side elevation of the locomotive with my invention attached. Fig. 2 is an elevation of the oil tank, the valve, and the actuating mechanism. Fig. 3 is a detail view showing the connection between the feeding pipe and the flange. And Fig. 4 is a detail sectional view of the valve.

My invention consists of a receptacle for a lubricant, a valve, preferably placed in the lower portion thereof, an actuating mechanism for said valve, and a pipe for conducting the lubricant from the valve to the flange.

The lubricant is introduced into the tank 3 through the pipe 16.

The valve whereby the lubricant is allowed to pass from the bottom of the tank 3 into the pipe 2, leading to the flange of the wheel 1, consists preferably of the valve casing 10, the plug 12, the stem 9, slidably seated in said casing and plug, and the spring 11, adapted normally to keep said valve closed.

The actuating mechanism consists of a swinging lever 5, pivoted to the arm or bracket 4 on the side of the tank 3. This lever is preferably weighted at the upper end with the ball 7 and so placed that it will swing with the lateral movement of the locomotive or car in rounding a curve. At its lower end, it is preferably provided with a plate 8, adapted to engage the stem 9 of the valve. When the ball of the lever swings away from the oil receptacle, the plate 8 will impinge against the stem 9, open the valve, and allow a flow of lubricant. If the ball 7 swings toward the lubricant, I provide a stop attached to the receptacle 3 whereby the lever 5 will be caused to bound away beyond its normal position and open the valve for the flow of lubricant. This stop preferably consists of a piece 14, arched so that the stop will be resilient, and provided with the adjustable extension 13, connected by the pin 15. By the adjustment of the extension 13 I vary the oscillation of the lever 15 so as to increase or decrease the amount of lubricant released.

To apply the lubricant to the wheel in exactly the right place, I shape the end of the pipe 2 so as to straddle the flange of the wheel 1. Thus I also prevent the oil from interfering with the bearing tension of the wheel.

I do not limit myself to the exact form in which my invention is herein disclosed further than is indicated in the claims which follow.

I claim:

1. A device for lubricating the flanges of car wheels and the like, comprising a valve and a pivoted swinging mechanism, said pivoted swinging mechanism being actuated by the lateral movement of the train and being adapted to open said valve.

2. A device for lubricating the flanges of car wheels and the like, comprising a valve, resiliently closed normally, and a pivoted swinging mechanism, actuated by the lateral movement of the train and adapted to open said valve by swinging against it.

3. A device for lubricating the flanges of car wheels and the like, comprising a valve and a lever weighted at one end and adapted to be swung by the lateral movement of the train against said valve to open it.

4. A device for lubricating the flanges of car wheels and the like, comprising a valve, a swinging lever and a stop; said swinging lever being adapted to open said valve when swinging away from said stop and said stop being adapted to cause said lever to swing away from it after swinging against it.

5. A device for lubricating the flanges of car wheels and the like, comprising a valve, a pivoted swinging mechanism, adapted to open said valve, and means for controlling the oscillation of said pivoted swinging mechanism.

6. A device for lubricating the flanges of car wheels and the like, comprising a valve, a pivoted swinging mechanism, adapted to open said valve, and resilient means for controlling the oscillation of said pivoted swinging mechanism.

7. A device for lubricating the flanges of car wheels and the like, comprising a valve, a pivoted swinging mechanism, adapted to open said valve, and means for variably controlling the oscillation of said pivoted swinging mechanism.

WALLACE LITSEY.

Witnesses:
L. W. MIX,
W. J. HODGE.

Copies of this patent may be obtained for five cents each, by addressing the "Commissioner of Patents, Washington, D. C."